United States Patent
Dhanuka

(10) Patent No.: US 11,246,047 B2
(45) Date of Patent: Feb. 8, 2022

(54) ELECTRONIC DEVICE AND CONTROL METHOD THEREOF

(71) Applicant: SAMSUNG ELECTRONICS CO., LTD., Suwon-si (KR)

(72) Inventor: Ankit Dhanuka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 16/527,618

(22) Filed: Jul. 31, 2019

(65) Prior Publication Data

US 2020/0154294 A1    May 14, 2020

(30) Foreign Application Priority Data

Nov. 12, 2018    (KR) .................. 10-2018-0137998

(51) Int. Cl.
| | |
|---|---|
| *H04W 24/08* | (2009.01) |
| *H04W 24/10* | (2009.01) |
| *H04M 1/72469* | (2021.01) |
| *H04W 84/12* | (2009.01) |

(52) U.S. Cl.
CPC ....... *H04W 24/08* (2013.01); *H04M 1/72469* (2021.01); *H04W 24/10* (2013.01); *H04W 84/12* (2013.01)

(58) Field of Classification Search
CPC ..... H04W 24/08; H04W 24/10; H04W 84/12; H04M 1/72583; H04M 1/24; H04M 1/7253; H04M 2250/06
See application file for complete search history.

(56) References Cited

U.S. PATENT DOCUMENTS

| | | | | |
|---|---|---|---|---|
| 7,940,686 B2 * | 5/2011 | Lehew | ............... | H04L 43/00 370/252 |
| 8,644,813 B1 * | 2/2014 | Gailloux | ............... | H04W 24/08 455/423 |
| 8,977,968 B2 | 3/2015 | Fan et al. | | |
| 9,270,492 B2 * | 2/2016 | Ansari | ............... | H04L 67/42 |
| 9,883,418 B2 | 1/2018 | Kim et al. | | |
| 10,142,860 B2 * | 11/2018 | Jain | ............... | H04L 43/04 |

(Continued)

FOREIGN PATENT DOCUMENTS

| | | |
|---|---|---|
| KR | 10-1608582 | 4/2016 |
| WO | 2018/117491 | 6/2018 |

OTHER PUBLICATIONS

International Search Report and Written Opinion dated Dec. 18, 2019 in counterpart International Application No. PCT/KR2019/010577.

(Continued)

*Primary Examiner* — Saumit Shah
(74) *Attorney, Agent, or Firm* — Nixon & Vanderhye P.C.

(57) ABSTRACT

An electronic device is provided. The electronic device includes: a communicator comprising communication circuitry; and a processor configured to control the communicator to communicate with an access point (AP) device, obtain information associated with a communication network between the AP device and the electronic device, estimate a bandwidth of the communication network based on the obtained information, identify whether the communication network has an error based on the estimated bandwidth, and provide guide information based on the identification result.

20 Claims, 13 Drawing Sheets

(56) References Cited

U.S. PATENT DOCUMENTS

| | | |
|---|---|---|
| 2008/0081580 A1 | 4/2008 | Cole |
| 2009/0113244 A1 | 4/2009 | Doshi et al. |
| 2010/0332906 A1* | 12/2010 | Agrawal ............ H04L 41/0806 |
| | | 714/37 |
| 2011/0222466 A1 | 9/2011 | Pance et al. |
| 2011/0238847 A1 | 9/2011 | Scott et al. |
| 2013/0297819 A1* | 11/2013 | Mittal .................. H04L 47/781 |
| | | 709/232 |
| 2015/0082097 A1 | 3/2015 | Brewer et al. |
| 2016/0226740 A1* | 8/2016 | Van Oost ................ H04L 43/16 |
| 2016/0242053 A1* | 8/2016 | Leontiadis ............ H04W 24/10 |
| 2017/0359735 A1 | 12/2017 | Jain et al. |
| 2018/0310243 A1* | 10/2018 | Yoshino ............... H04W 48/20 |
| 2019/0313312 A1 | 10/2019 | Gupta et al. |

OTHER PUBLICATIONS

Extended European Search Report dated Sep. 9, 2021 for EP Application No. 19885487.9.

\* cited by examiner

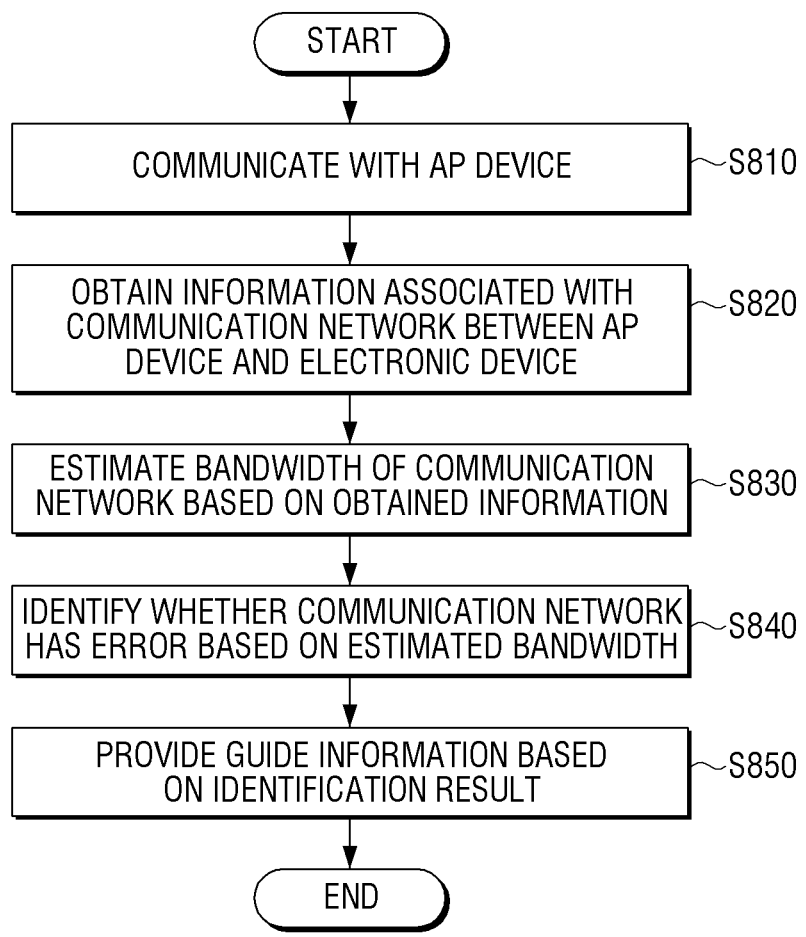

ELECTRONIC DEVICE AND CONTROL METHOD THEREOF

CROSS-REFERENCE TO RELATED APPLICATION

This application is based on and claims priority under 35 U.S.C. § 119 to Korean Patent Application No. 10-2018-0137998, filed on Nov. 12, 2018, in the Korean Intellectual Property Office, the disclosure of which is incorporated by reference herein in its entirety.

BACKGROUND

Field

The disclosure relates to an electronic device and a control method thereof, and for example, to an electronic device communicating with an external device and a control method thereof.

Description of Related Art

Devices accessible to the Internet via Wi-Fi are increasing, and accordingly, network performance issues are increasing. It is difficult to identify whether low network performance is due to a low Internet service speed provided by an Internet service provider (ISP) or due to a low Wi-Fi bandwidth of a device that accesses the Internet.

There are many tools for measuring a network speed, but it is difficult to measure a Wi-Fi bandwidth of a client device, not depending on an access point or another device connected to the access point.

For example, when using an additional device connected to an access point (AP), the Wi-Fi bandwidth can be measured using an additional device for driving an internet performance (iperf) server on the client's device and driving an iperf client. However, this requires an additional device for driving an iperf client/server, and thus requires complicated procedures and additional costs in that iperf software should be installed on the client device and on the additional device.

SUMMARY

Embodiments of the disclosure address the above disadvantages and other disadvantages not described above.

The disclosure provides an electronic device for estimating a bandwidth of a communication network between an access point (AP) device and the electronic device and providing guide information for addressing a network error, and a control method thereof.

According to an example embodiment of the disclosure, an electronic device includes: a communicator comprising communication circuitry; and a processor configured to: control the communicator to communicate with an access point (AP) device, obtain information associated with a communication network between the AP device and the electronic device, estimate a bandwidth of the communication network based on the obtained information, identify whether the communication network has an error based on the estimated bandwidth, and provide guide information based on the identification result.

The processor may estimate the bandwidth of the communication network by obtaining the information associated with the communication network according to an event associated with a network error, and provide first guide information based on the estimated bandwidth being a threshold level or above and provide second guide information based on the estimated bandwidth being below the threshold level. The first guide information may include different information from the second guide information.

Based on the estimated bandwidth being the threshold level or above, the processor may identify that the error is not caused by the electronic device or the AP device and provide the first guide information corresponding to the identification result, and based on the estimated bandwidth being below the threshold level, the processor may identify that the error is caused by at least one of the electronic device or the AP device and provide the second guide information corresponding to the identification result.

Based on the estimated bandwidth being the threshold level or above, the processor may identify that the error is caused by a communication network between the AP device and an Internet service provider (ISP) and provide the first guide information corresponding to the identification result.

The event associated with the network error may include an event in which a user command for performing a network error check is input.

The information associated with the communication network may include at least one of received signal strength indicator (RSSI) information, communication channel information, link speed information, communication protocol mode information, channel interference information, or retry rate information.

The processor may estimate the bandwidth of the communication network based on at least two factors of a mode factor obtained based on the communication protocol mode information, a link speed factor obtained based on the link speed information, a link quality ratio factor obtained based on the RSSI information and the communication protocol mode information, an interference ratio factor obtained based on the channel interference information and the communication protocol mode information, or a retry rate ratio factor obtained based on at least one of the retry rate information, the communication protocol mode information, or the RSSI information.

The processor may obtain the information associated with the communication network from network firmware installed in a network adapter by driving a device driver.

The electronic device may further include a display, and the processor may control the display to display the guide information.

The communication network may be a Wi-Fi network.

According to another example embodiment of the disclosure, a method of controlling an electronic device includes: communicating with an access point (AP) device; obtaining information associated with a communication network between the AP device and the electronic device; estimating a bandwidth of the communication network based on the obtained information; identifying whether the communication network has an error based on the estimated bandwidth; and providing guide information based on the identification result.

In the estimating of the bandwidth of the communication network, the bandwidth of the communication network may be estimated by obtaining the information associated with the communication network according to an event associated with a network error. In the providing of the guide information, first guide information may be provided based on the estimated bandwidth being a threshold level or above, and second guide information may be provided based on the estimated bandwidth being below the threshold level. The first guide information may include different information from the second guide information.

In the providing of the guide information, based on the estimated bandwidth being the threshold level or above, it may be identified that the error is not caused by the electronic device or the AP device and the first guide information corresponding to the identification result may be provided, and based on the estimated bandwidth being below the threshold level, it may be identified that the error is caused by at least one of the electronic device or the AP device and the second guide information corresponding to the identification result may be provided.

In the providing of the guide information, based on the estimated bandwidth being the threshold level or above, it may be identified that the error is caused by a communication network between the AP device and an Internet service provider (ISP) and the first guide information corresponding to the identification result may be provided.

The event associated with the network error may include an event in which a user command for performing a network error check is input.

The information associated with the communication network may include at least one of received signal strength indicator (RSSI) information, communication channel information, link speed information, communication protocol mode information, channel interference information, or retry rate information.

In the estimating of the bandwidth of the communication network, the bandwidth of the communication network may be estimated based on at least two factors of a mode factor obtained based on the communication protocol mode information, a link speed factor obtained based on the link speed information, a link quality ratio factor obtained based on the RSSI information and the communication protocol mode information, an interference ratio factor obtained based on the channel interference information and the communication protocol mode information, or a retry rate ratio factor obtained based on at least one of the retry rate information, the communication protocol mode information, or the RSSI information.

In the obtaining of the information associated with the communication network, the information associated with the communication network may be obtained from network firmware installed in a network adapter by driving a device driver.

The providing of the guide information may further include displaying the guide information on a display.

According to another example embodiment of the disclosure, a non-transitory computer readable medium storing computer instructions for a display device is provided. The instructions, when executed by a processor of an electronic device cause the electronic device to perform operations. The operations may include: obtaining information associated with a communication network between an access point (AP) device and the electronic device; estimating a bandwidth of the communication network based on the obtained information; determining whether the communication network has an error based on the estimated bandwidth; and providing guide information based on the check result.

According to the various example embodiments of the disclosure as described above, when a network error occurs, appropriate guide information for addressing the error can be provided. In addition, a network bandwidth can be measured without requiring a separate additional device.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 8 is a flowchart illustrating an example method of controlling an electronic device according to an embodiment of the disclosure.

DETAILED DESCRIPTION

Hereinafter, the disclosure will be described in greater detail with reference to the accompanying drawings.

The terms used in the disclosure will be briefly described, and the disclosure will be described in detail.

The terms used with respect to the embodiments of the disclosure are selected from general terms that are currently in wide use if possible in consideration of functions in the disclosure, but may vary according to intentions of those skilled in the art, precedents, the advent of new technologies, and the like. In some cases, terms may be arbitrarily selected. When terms are arbitrarily selected, such terms may be described in detail in the relevant description section of the disclosure. Accordingly, the terms used in the disclosure should be defined based on the meaning of the terms and the contents throughout the disclosure rather than simple names of the terms.

In the disclosure, the expression "have", "may have", "include", "may include", or the like indicates the existence of corresponding features (for example, elements such as numerical values, functions, operations, or components), and do not preclude the presence of additional features.

The expression "at least one of A or/and B" should be interpreted to refer to any one of "A", "B", or "A and B".

As used in the disclosure, the expression "first", "second", or the like may refer to various elements regardless of sequence and/or importance, and does not limit the elements. These terms are only used to distinguish one element from another element.

It should be understood that when an element (e.g. a first element) is referred to as being "(operatively or communicatively) coupled with/to" or "connected to" another element (e.g. a second element), it may be coupled with/to or connected to the other element directly or via an intervening element (e.g. a third element).

Singular forms include plural forms unless the context clearly indicates otherwise. It should be further understood that term "include", "formed of", or the like used in the disclosure specifies the presence of features, numerals, steps, operations, components, parts, or combinations thereof mentioned in the disclosure, but does not preclude the presence or addition of one or more other features, numerals, steps, operations, components, parts, or combinations thereof.

In the disclosure, a "module" or "unit" performs at least one function or operation, and may be implemented by hardware or software or a combination of hardware and software. In addition, a plurality of "modules" or a plurality of "units" are integrated into at least one module except for the "module" or "unit" which needs to be implemented by specific hardware and thus may be implemented by at least one processor (not shown).

Hereinafter, various example embodiments of the disclosure will be described in greater detail with reference to the accompanying drawings.

Figure 1:
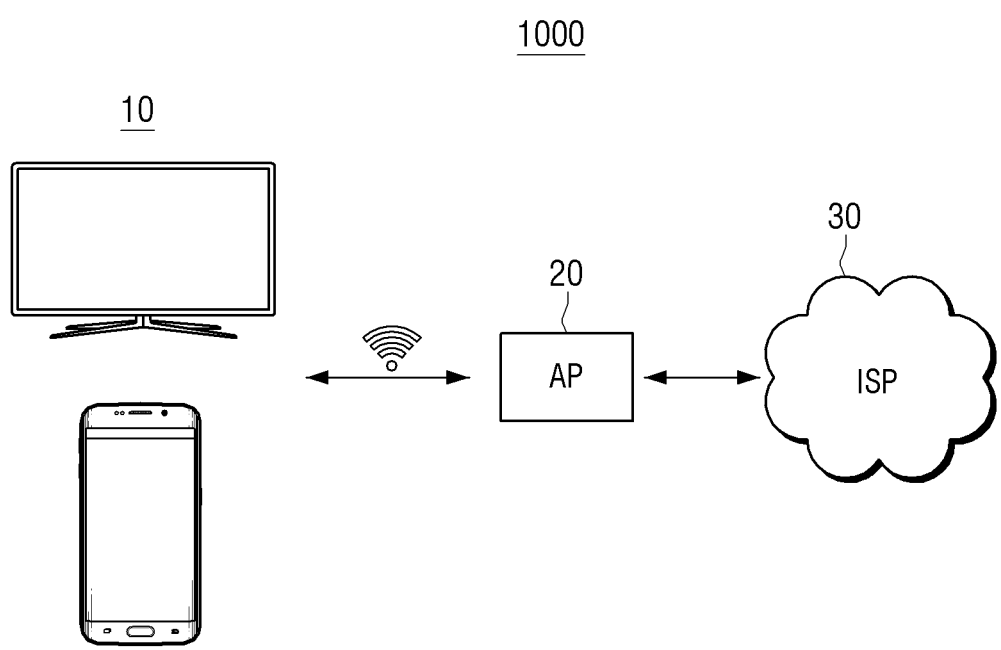
FIG. 1 is a diagram illustrating an example communication system according to an embodiment of the disclosure.

FIG. 1 is a diagram illustrating an example communication system according to an embodiment of the disclosure.

Referring to FIG. 1, a communication system 1000 according to an embodiment of the disclosure may include a client device 10, an access point (AP) device 20, and an Internet service provider (ISP) 30.

The client device 10 may communicate with the AP device 20, and may be implemented as a device provided with a wireless Internet service. For example, the client device 10 may include, for example, and without limitation, at least one of a smart television (TV), a smartphone, a tablet personal computer (PC), a mobile phone, a video phone, an electronic book reader, a desktop PC, a laptop PC, a netbook computer, a game machine, a workstation, a server, a personal digital assistant (PDA), a portable multimedia player (PMP), an MP3 player, a medical device, a home appliance, a security device, a camera, a printer, a wearable device, or the like.

The AP device 20 may, for example, be a relay device that assists the client device 10 with the Internet access to use the wireless Internet service. In general, the AP device 20 is distinguished from a router in that it serves as a wireless hub without having an IP routing function, but the AP device 20 is not so limited, and may be implemented as a router according to an embodiment of the disclosure. According to an embodiment, the AP device 20 may be implemented as a wireless access point (WAP) using related standards using Wi-Fi (or a wireless local area network (LAN)). In this example, the client device 10 may communicate with the AP device 20 through a Wi-Fi network.

The ISP 30 (or an Internet access provider (IAP)) may provide an Internet service through the AP device 20 to the client device 10.

The ISP 30 may refer, for example, to a company providing an Internet access service, a web site creating and web hosting service, and the like to an individual or an enterprise. The ISP 30 has equipment and communication lines required for the Internet access to provide the Internet service, and large-size ISPs have their own dedicated high-speed lines. For communication between the AP device 20 and the ISP 30, an Ethernet, a Metro Ethernet, a Gigabit Ethernet, a digital subscriber line (DSL), a frame relay, an integrated services digital network (ISDN), an asynchronous transfer mode (ATM), a satellite Internet, a synchronous optical networking (SONET), DSL, a wireless LAN, a cable modem, a fiber to the home (FTTH), ISDN, or the like, may be used, but the disclosure is not limited thereto.

According to an embodiment of the disclosure, the client device 10 may access the AP device 20 and use the wireless Internet service provided by the ISP 30. In this example, when a network error occurs, the client device 10 needs to provide a user with appropriate guide information for solving (e.g., addressing) the problem.

Hereinafter, there will be described various example embodiments in which when a network error occurs, it is identified (or determined) whether the error is caused by abnormality of a network (for example, a Wi-Fi network) between the client device 10 and the AP device 20 and appropriate guide information is provided based thereon.

Figure 2:
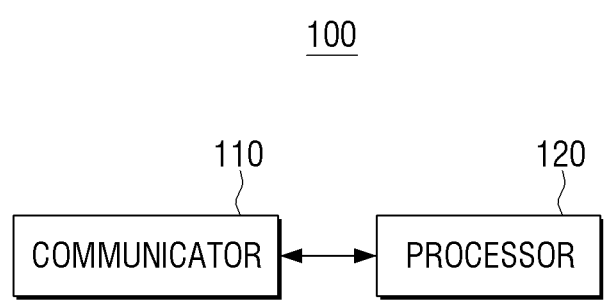
FIG. 2 is a block diagram illustrating an example configuration of an electronic device according to an embodiment of the disclosure.

FIG. 2 is a block diagram illustrating an example configuration of an electronic device according to an embodiment of the disclosure.

Referring to FIG. 2, the electronic device 100 may be implemented as the client device 10 shown in FIG. 1.

A communicator 110 may include various communication circuitry and communicate with a network device (not shown).

According to an embodiment, the communicator 110 may include various communication circuitry included in a wireless communication module communicating with the AP device 20 shown in FIG. 1. For example, the wireless communication module of the communicator 110 may be a Wi-Fi module. The Wi-Fi module may perform communication according to at least one standard version of 802.11a, 802.11b, 802.11g, 802.11n, or 802.11ac, but it is not limited thereto and a new version to be developed later may be included.

According to an embodiment, the communicator 110 may include network firmware and a device driver (or a network driver) capable of recognizing the network firmware in the operating system of the electronic device 100. The network firmware may be installed in hardware such as a network adapter, and the device driver may be installed in a main body of the electronic device 100 or installed on the electronic device 100 using an interface (e.g. a universal serial bus (USB)).

For example, when the communicator 110 includes the Wi-Fi module, the Wi-Fi module may include Wi-Fi firmware and a Wi-Fi driver capable of recognizing the Wi-Fi firmware in the operating system of the electronic device 100. Here, the Wi-Fi firmware (or wireless LAN card) may be installed as hardware in the main body of the electronic device 100, or installed on the electronic device 100 using an interface (e.g. USB). For example, the Wi-Fi firmware may be implemented in, for example, and without limitation, at least one type of peripheral component interconnect (PCI), PCI-Express, personal computer memory card association (PCMCIA), USB, or the like.

According to an embodiment, a processor 120 may include various processing circuitry, such as, for example, and without limitation, a central processing unit (CPU), a digital signal processor (DSP), a microprocessor, a time controller (TCON), or the like, but is not limited thereto. According to an implementation of the electronic device 100, the processor 120 may include various processing circuitry, such as, for example, and without limitation, one or more of a micro controller unit (MCU), a micro processing unit (MPU), a controller, an application processor (AP), a graphics-processor unit (GPU), a communication processor (CP), an advanced RISC machine (ARM) processor, or the like, or may be defined by the corresponding terms. The processor 120 may be implemented as a system on chip (SoC) or a large scale integration (LSI) in which processing algorithms are embedded, or may be implemented in a field programmable gate array (FPGA) type. The processor 120 may perform various functions by executing computer executable instructions stored in a memory (not shown).

The processor 120 may control the communicator 110 to communicate with the AP device 20.

The processor 120 may obtain information associated with a communication network between the AP device 20 and the electronic device 100, and estimate a bandwidth of the communication network based on the obtained information. The communication network between the AP device 20 and the electronic device 100 may be a Wi-Fi network, but is not limited thereto. For convenience of description, the communication network between the AP device 20 and the electronic device 100 will be referred to as the Wi-Fi network hereinafter.

The processor 120 may identify (e.g., determine or check—hereinafter, the terms "identify", "check" and "determine" may be used interchangeably) whether the communication network has an error based on the estimated bandwidth, and provide the guide information based on identification result. The bandwidth may, for example, be a range of data transmitted from the network. The higher the bandwidth is, the faster the service can be provided to the client. For example, the bandwidth may be expressed as the number of bits per second, and may represent an available bit rate (the maximum amount that can be transmitted per second) or a bit rate of a consumed information amount.

According to an embodiment, the processor 120 may estimate a bandwidth of the communication network by obtaining the information associated with the communication network according to an event associated with a network error.

The event associated with the network error may include an event in which a user command for performing a network error check is input.

The user command may include a command selecting a user interface (UI) for performing a network error check, a case of retrying network connection several times, or the like. For example, this may be a case in which the user selects a network error check menu (e.g. a diagnosis button), a case in which the user repeats an action of selecting and then releasing a Wi-Fi activation icon, or the like. This may also be a case in which the electronic device 100 detects a network error.

The processor 120 may provide first guide information if the estimated bandwidth is a threshold level or above, and provide second guide information if the estimated bandwidth is below the threshold level. The first guide information may include different information from the second guide information.

For example, if the estimated bandwidth is the threshold level or above, the processor 120 may determine that the error is not caused by the electronic device 100 or the AP device 20, and provide the first guide information corresponding to the identification result.

For example, the processor 120 may identify that the network error is caused by a communication network between the AP device 20 and the ISP 30, and provide the first guide information such as "Contact ISP" or "ISP Communication Error". In general, the error of the communication network between the AP device 20 and the ISP 30 may occur when the ISP 30 provides a low-bandwidth or low-speed Internet service.

If the estimated bandwidth is below the threshold level, the processor 120 may identify that the error is caused by at least one of the electronic device 100 or the AP device 20, and provide the second guide information corresponding to the identification result. For example, the processor 120 may provide the second guide information such as "Contact Manufacturer".

The processor 120 may obtain the information associated with the communication network between the AP device 20 and the electronic device 100 from network firmware installed in a network adapter by driving a network driver.

The information associated with the communication network may include at least one of received signal strength indicator (RSSI) information, communication channel information, link speed information, communication protocol mode information, channel interference information, or retry rate information.

The RSSI information may refer, for example, to received signal strength in a wireless communication environment. The RSSI information may be expressed in dBm units, but is not limited thereto. The RSSI indicates a signal power received in a wireless receiver, and thus does not take into account the antenna gain, the loss inside the circuit, the cable loss, and the like. Accordingly, the higher the RSSI value, the greater the received signal strength.

The communication channel information may refer, for example, to information about at least one of a channel and a frequency through/at which the electronic device 100, e.g., the client device, is connected to the AP device 20. The communication channel information may be basic service set (BSS) channel information of the Wi-Fi communication network.

The link speed information may refer, for example, to information about a rate of packets transmitted from the electronic device 100, i.e. the client device to the AP device 20. The higher the link speed, the better the network bandwidth.

The communication protocol mode information may refer, for example, to information about a protocol used for association between the electronic device 100, e.g., the client device, and the AP device 20. For example, the protocol information may refer to Wi-Fi protocol information. Each Wi-Fi protocol defines a rate at which packets can be transmitted. For example, the Wi-Fi protocol mode may include at least one of 802.11a, 802.11b, 802.11g, 802.11n, or 802.11ac. The 802.11n and 802.11ac protocols may additionally obtain high throughput (HT) mode information. Currently supported channel width modes are HT20, HT40, and HT80.

The channel interference information may be calculated by measuring an interference factor for each channel using various channel radio frequency (RF) parameters such as a channel active time, a channel busy time, and a channel transmit time, and taking a weighted average of the interference factors on a primary channel and all overlapping channels.

For example, the interference factor may be calculated by the following equation: Interference factor=(channel busy time−channel transmit time)/(channel active time−channel transmit time). The channel active time may refer, for example, to a time when a Wi-Fi channel is active and data can be transmitted, the channel busy time may refer, for example, to a time when the Wi-Fi channel is busy and data cannot be transmitted, and the channel transmit time refers to a time when the Wi-Fi channel actually transmits data.

The retry rate information indicates a percentage of retried transmission packets (Tx packets) per second. For example, the Wi-Fi bandwidth may be inversely proportional to the retry rate.

When the communication network is a Wi-Fi network according to an embodiment of the disclosure, information associated with the Wi-Fi network, i.e. Wi-Fi parameters, may be obtained from the Wi-Fi driver and firmware using iw commands. The "iw", which is a type of interface between the client device and a kernel, e.g., the network driver, may, for example, be an nl80211 based on CLI configuration utility for wireless devices. The "iw" supports all drivers that have been added to the kernel recently. Table 1 below provides a list of iw commands that are required to obtain Wi-Fi parameters and parameters.

TABLE 1

| Number | Wi-Parameter | iw command | iw command parameter |
|---|---|---|---|
| 1 | BSS Channel | "iw dev <wlan if> scan dump" and grep for "associated" | Channel freq |
| 2 | Retry rate | iw dev <wlan if> station dump | tx_retries tx_packets |
| 3 | ChannelInterference | iw dev <wlan if> survey dump | channel active time channelbusy time channel transmit time frequency |
|  |  | "iw dev <wlan if>scan dump" and grep for "associated" | secondary channel offset |
| 4 | RSSI | iw dev <wlan if> station dump | signal |
| 5 | Link Speed | iw dev <wlan if> station dump | tx bitrate |
| 6 | WiFi Protocol | "iw dev <wlan if> scan dump" and grep for "associated" | HT capabilities Supported rates VHT |

However, the "iw command" is merely an example, and various types of interfaces are usable between software of the client device capable of obtaining information associated with the communication network, i.e. the electronic device 100, and the kernel (or kernel space), i.e. the network driver.

Figure 3:
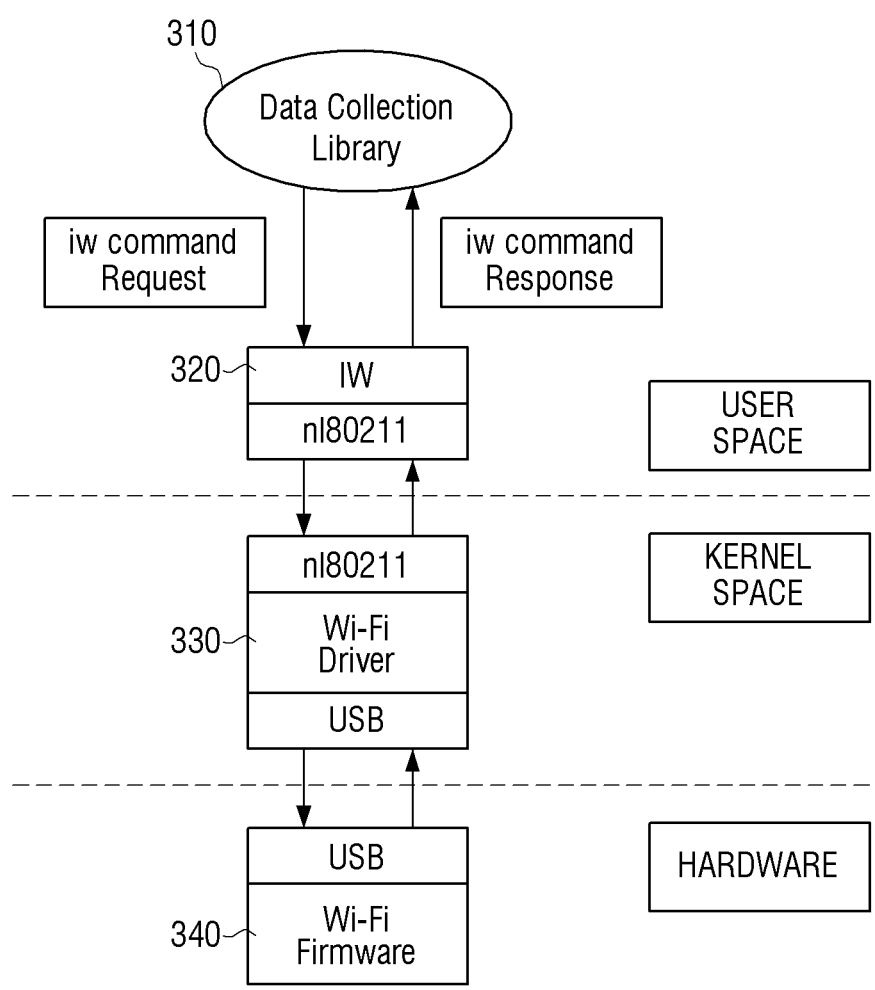
FIG. 3 is a diagram illustrating an example software architecture for obtaining a Wi-Fi parameter using an iw command from a Wi-Fi driver or firmware according to an embodiment of the disclosure.

FIG. 3 is a diagram illustrating an example software architecture for obtaining a Wi-Fi parameter using an iw command from a Wi-Fi driver or firmware according to an embodiment of the disclosure.

The data collection library 310 may refer, for example, to a library of a user space for transmitting and receiving iw commands for obtaining Wi-Fi parameters. The data collection library 310 may obtain Wi-Fi parameters, estimate a bandwidth using the obtained Wi-Fi parameters, and provide the estimated bandwidth. That is, it may correspond to the operation of the processor 120 according to an embodiment of the disclosure.

The IW 320 may, for example, be an nl80211 based on CLI configuration utility for wireless devices. Whenever the data collection library calls an iw command, a netlink socket may be used to communicate with the Wi-Fi driver and transmit or receive data. The nl80211 is an 802.11 netlink interface public header. The nl80211 operates as an interface between a user space (e.g. the processor 120) and a kernel space (e.g. the Wi-Fi driver) to transmit and receive 802.11-related commands (e.g. commands).

The Wi-Fi driver 330 may, for example, be a software program that drives the system to interact with the Wi-Fi adapter. For example, the Wi-Fi driver 330 may interact with Wi-Fi firmware 340 using an interface such as a USB and enable the iw command to be filled with requested Wi-Fi parameter.

The Wi-Fi firmware 340 may, for example, be a software program providing a low-level control for the Wi-Fi adapter. The Wi-Fi firmware 340 may interact with Wi-Fi hardware (e.g. a Wi-Fi dongle), and transmit and receive Wi-Fi data on air.

The processor 120 may estimate the bandwidth of the communication network based on at least two factors of a mode factor obtained based on the communication protocol mode information, a link speed factor obtained based on the link speed information, a link quality ratio factor obtained based on the RSSI information and the communication protocol mode information, an interference ratio factor obtained based on the channel interference information and the communication protocol mode information, or a retry rate ratio factor obtained based on at least one of the retry rate information or the communication protocol mode information.

According to an embodiment, the processor 120 may estimate the bandwidth of the communication network taking into account all of the mode factor, the link speed factor, the link quality ratio factor, the interference ratio factor, and the retry rate ratio factor. For example, the processor 120 may estimate a throughput based on the following Equation 1.

$$\text{EstimatedThroughput(Mbits/s)} = \text{Modefactor} * \text{LinkSpeed} * LQ_{ratio} * RR_{ratio} * \text{INTF}_{ratio} \quad \text{[Equation 1]}$$

The mode factor may be a numerical value assigned to each communication protocol mode, for example, 0.7 for 802.11a, 0.7 for 802.11b, 0.5 for 802.11g, 0.7 for high throughput HT20, 0.6 for HT40, and 0.35 for HT80.

The link speed factor may refer, for example, to a rate at which packets are transmitted from the electronic device 100 to the AP device 20. The better the link speed, the better the Wi-Fi throughput. The link speed value may be obtained using the iw command for link speed shown in Table 1.

The link quality ratio (LQ ratio) factor, which is a value depending on the RSSI of the electronic device 100, may be obtained using the iw command for RSSI shown in Table 1. For example, the link quality ratio factor may be obtained based on the following Equation 2.

$$LQ_{ratio} = 2.718^{(LQ-1)*LQfactor}$$

$$LQ = (110 + RSSI)/70 \quad \text{[Equation 2]}$$

The LQ factor may be a numerical value assigned to each HT mode. For example, the LQ factor may be 2.5 if the HT mode is HT20, the LQ factor may be 1.4 if the HT mode is HT40, and the LQ factor may be 0.5 if the HT mode is HT80.

The interference ratio (INTF_ratio) factor may be obtained by measuring an interference factor for each channel, and taking a weighted average of the interference factors on a primary channel and all overlapping channels.

For example, the interference factor may be obtained based on the following Equation 3.

$$\text{nferencefactor}=(\text{channelbusytime}-\text{channeltransmittime})/(\text{channelactivetime}-\text{channeltransmittime}) \quad [\text{Equation 3}]$$

According to an embodiment, the channel interference on channel 1 in the HT20 mode may be calculated by the equation: Channel interference on channel 1=((interference factor on channel 1)+(0.85*interference factor on channel 2)+(0.55*interference factor on channel 3))/(1+0.85+0.55).

The channel busy time, the channel transmit time, and the channel active time for any Wi-Fi channel may be obtained using the iw command for channel interference shown in Table 1.

The channel interference command provides data for all channels. Accordingly, the interference factor for each channel may be calculated by browsing through each channel using Equation 3. Once the interference factor for each channel is calculated, the total interference of all the channels may be calculated by taking a weighted average of the interference factors on the primary channel and all the overlapping channels.

$$\text{INTF}_{ratio}=(1-\text{channelinterference})^{INTFfactor} \quad [\text{Equation 4}]$$

The INTF factor may be a numerical value assigned to each HT mode. For example, the INTF factor may be 0.3 if the HT mode is HT20, the INTF factor may be 0.4 if the HT mode is HT40, and the INTF factor may be 0.4 if the HT mode is HT80.

The retry rate ratio (RR ratio) factor indicates a percentage of retried transmission packets (Tx packets) per second. For example, the Wi-Fi bandwidth may be inversely proportional to the retry rate. For example, the retry rate ratio factor may be obtained based on the following Equation 5.

$$\text{RR}_{ratio}=2.718^{(-retryrate)*RRfactor} \quad [\text{Equation 5}]$$

where retry rate=(the number of Tx packets getting retried per second)/(the number of Tx packets transmitted per second).

The number of Tx packets transmitted and the number of Tx packets getting retried may be obtained using the iw command for retry rate shown in Table 1.

The RR factor may be a numerical value assigned based on at least one of the retry rate information, the communication protocol mode information, or the RSSI information. For example, the RR factor may be 0.7 if the protocol is 802.11a, 802.11b or 802.11g, and the RR factor may be 0.7 if the HT mode is HT20. The RR factor may be 2.1, if the HT mode is HT40, the protocol is 802.11n, and the RSSI is larger than −60. The RR factor may be 0.9, if the HT mode is HT40, the protocol is 802.11n, and the RSSI is smaller than −60. The RR factor may be 1.2, if the HT mode is HT40, the protocol is 802.11ac, and the RSSI is larger than −60. The RR factor may be 2.1, if the HT mode is HT80, the protocol is 802.11ac, and the RSSI is larger than −60. The RR factor may be 0.4, if the HT mode is HT40 or HT80, the protocol is 802.11ac, and the RSSI is smaller than −60. This can be summarized as shown in Table 2 below.

TABLE 2

| | |
|---|---|
| If protocol is 802.11a/b/g | RR factor = 0.7 |
| If HT mode is HT20 | RR factor = 0.7 |
| If HT mode is HT40, protocol is 802.11n RSSI > −60 | RR factor = 2.1 |
| If HT mode is HT40, protocol is 802.11n, RSSI < −60 | RR factor = 0.9 |

TABLE 2-continued

| | |
|---|---|
| If HT mode is HT40, protocol is 802.11ac, RSSI > −60 | RR factor = 1.2 |
| If HT mode is HT80, protocol is 802.11ac, RSSI > −60 | RR factor = 2.1 |
| If HT mode is HT40/HT80, protocol is 802.11ac, RSSI < −60 | RR factor = 0.4 |

The numerical values assigned in the above-mentioned equations and the like are values that are assigned relatively in consideration of the influence or importance of each parameter on the bandwidth estimation, etc. Therefore, those skilled in the art may be obviously aware that the numerical values are not limited to those described above.

Figure 4:
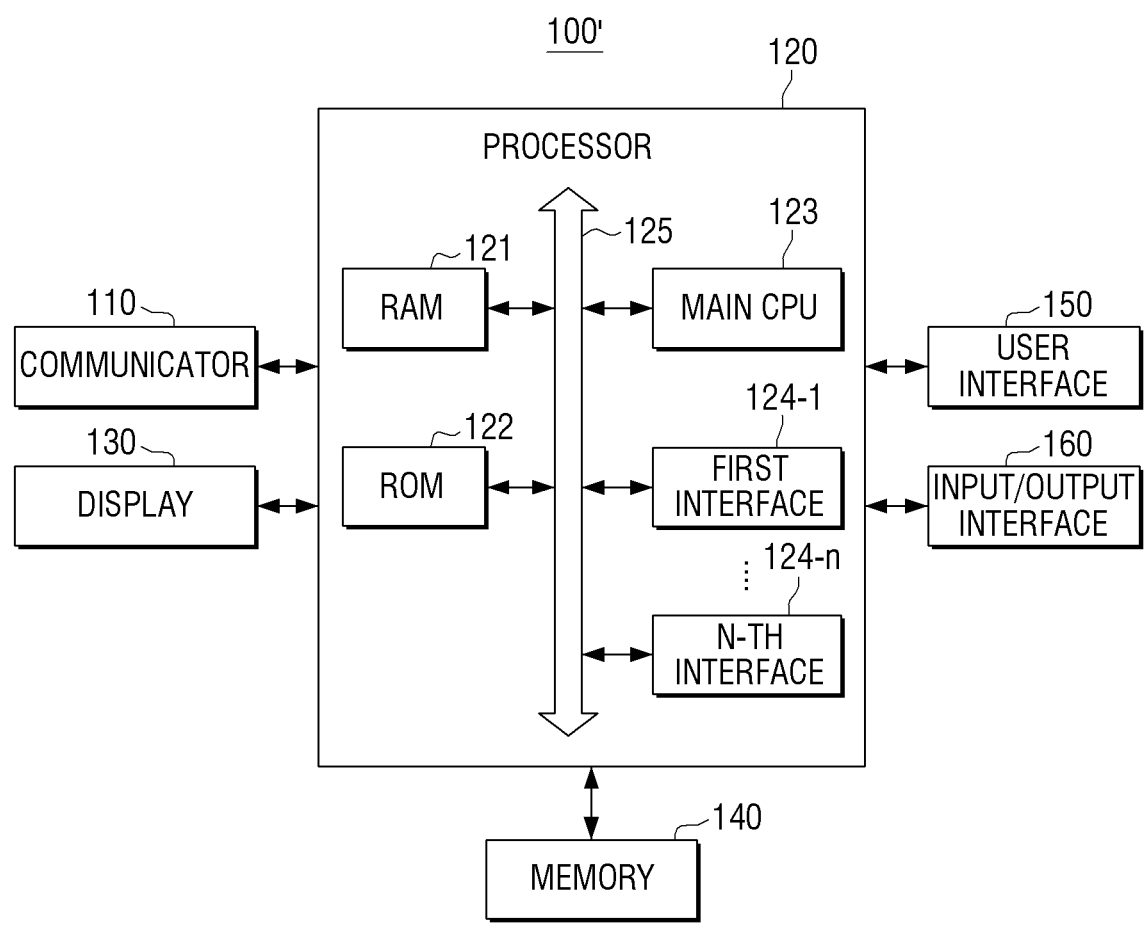
FIG. 4 is a diagram illustrating an example configuration of an electronic device according to an embodiment of the disclosure.

FIG. 4 is a diagram illustrating an example configuration of an electronic device according to an embodiment of the disclosure.

Referring to FIG. 4, the electronic device 100' includes a communicator (e.g., including communication circuitry) 110, a processor (e.g., including processing circuitry) 120, a display 130, a memory 140, a user interface 150, and an input/output interface 160.

The display 130 may be implemented in various types of displays such as, for example, and without limitation, a liquid crystal display (LCD), an organic light emitting diodes (OLED) display, a light emitting diodes (LED), a plasma display panel (PDP), or the like. The display 160 may include a driving circuit, a backlight unit, etc. therein together, and the driving circuit may, for example, and without limitation, be implemented in the form of an amorphous silicon (a-Si) thin film transistor (TFT), a low temperature poly silicon (LTPS) TFT, an organic TFT (OTFT), or the like. The display 130 may be implemented as a touch screen combined with a touch sensor, a flexible display, a three-dimensional (3D) display, or the like.

In addition, according to an embodiment of the disclosure, the display 130 may include not only a display panel outputting an image, but also a bezel housing the display panel. For example, according to an embodiment of the disclosure, the bezel may include a touch sensor (not shown) for sensing user interaction.

The processor 120 may include various processing circuitry and control the display 130 to display guide information according to various embodiments of the disclosure.

The memory 140 may store data required for various embodiments of the disclosure. For example, the memory 140 may be implemented as an internal memory included in the processor 120 such as a read-only memory (ROM) (e.g. an electrically erasable programmable read-only memory (EEPROM)) or a random-access memory (RAM), or implemented as a separate memory from that of the processor 120. In this case, the memory 140 may be implemented in the form of a memory embedded in the electronic device 100' or a memory detachable from the electronic device 100', according to the data storage purpose. For example, data for driving the electronic device 100' may be stored in the memory embedded in the electronic device 100', and data for the extended function of the electronic device 100' may be stored in the memory detachable from the electronic device 100'. The memory embedded in the electronic device 100' may be implemented as at least one of a volatile memory (e.g. a dynamic RAM, (DRAM), a static RAM (SRAM), or a synchronous dynamic RAM (SDRAM)), a non-volatile memory (e.g. a one time programmable ROM (OTPROM), a programmable ROM (PROM), an erasable and programmable ROM (EPROM), an electrically erasable and programmable ROM (EEPROM), a mask ROM, or a flash ROM, a flash memory (e.g. a NAND flash memory or a NOR flash memory), a hard drive, or a solid state drive (SSD). The memory detachable from the electronic device 100' may be implemented in the form of a memory card (e.g. a compact flash (CF), a secure digital (SD), a micro secure digital (micro-SD), a mini secure digital (mini-SD), an extreme digital (xD), or a multi-media card (MMC)), an external memory connectable to a USB port (e.g. a USB memory), or the like.

The information associated with the communication network obtained by the processor 120 according to an embodiment may be stored in the memory 140.

The communicator 110 may include various communication circuitry and is configured to communicate with various types of external devices according to various types of communication methods. The communicator 110 may include various modules including various communication circuitry, such as, for example, and without limitation, a Wi-Fi module, a Bluetooth module, an infrared communication module, a wireless communication module, and the like. Each communication module may be implemented in the form of at least one hardware chip.

The processor 120 may communicate with various external devices using the communicator 110. The external device may include a display device such as a TV, an image processing device such as a set-top box, a network relay device such as an AP device, an external server, a control device such as a remote control, a sound output device such as a Bluetooth speaker, a lighting device, a home appliance such as a smart cleaner or a smart refrigerator, a server such as an Internet of Things (IOT) home manager, or the like, according to an implementation the electronic device 100.

The Wi-Fi module and Bluetooth module may perform communication in a Wi-Fi mode and in a Bluetooth mode, respectively. When the Wi-Fi module or Bluetooth module is used, various connection information such as a subsystem identification (SSID) and a session key is transmitted and received first. After connection using the connection information is completed for communication, various information may be transmitted and received.

The infrared communication module may perform communication according to infrared data association (IrDA) technology in which data is transmitted wirelessly at a short distance using infrared rays between visible rays and millimeter waves.

The wireless communication module may include at least one communication chip performing communication according to the various wireless communication standards other than the above-described communication methods, such as Zigbee, 3rd generation (3G), 3rd generation partnership project (3GPP), long term evolution (LTE), long term evolution-advanced (LTE-A), 4th generation (4G), and 5th generation (5G).

In addition, the communicator 110 may include at least one of a LAN module, an Ethernet module, a wired communication module, or the like, that may perform communication using a pair cable, a coaxial cable, an optical fiber cable, or the like.

The electronic device 100' may further include a tuner and a demodulator according to an implementation.

Among RF broadcast signals received through an antenna, the tuner (not shown) may tune a channel selected by a user or all channels that have previously been stored to receive the RF broadcast signals.

The demodulator (not shown) may receive and demodulate digital intermediate frequency (DIF) signals converted by the tuner, and perform channel decoding or the like.

The processor 120 controls the overall operations of the electronic device 100' using various programs stored in the memory 140.

For example, the processor 120 may include a RAM 121, a ROM 122, a main CPU 123, first to n-th interfaces 124-1 to 124-*n*, and a bus 125.

The RAM 121, the ROM 122, the main CPU 123, and the first to n-th interfaces 124-1 to 124-*n* may be connected to each other via the bus 125.

A set of commands for booting the system and the like are stored in the ROM 122. When a turn-on command is input and power is supplied, the main CPU 123 copies an operating system (O/S) stored in the memory 140 to the RAM 121 according to the commands stored in the ROM 122, and executes the O/S to boot the system. Once the booting is completed, the main CPU 123 copies various application programs stored in the memory 140 to the RAM 121, executes the application programs copied to the RAM 121, and performs various operations.

The main CPU 123 accesses the memory 140 and performs booting using the O/S stored in the memory 140, and performs various operations using the various programs and content data stored in the memory 140.

The first to n-th interfaces 124-1 to 124-*n* are connected to the various components described above. One of the interfaces may be a network interface connected to an external device via a network.

The processor 120 may perform a graphics processing function (video processing function). For example, the processor 120 may generate a screen including various objects such as an icon, an image, and a text using a calculator (not shown) and a renderer (not shown). Here, the calculator (not shown) may calculate attribute values such as a coordinate value, a shape, a size, and a color in which each object is to be displayed according to the layout of the screen based on the received control commands. The renderer (not shown) may generate screens of various layouts including the objects based on the attribute values calculated by the calculator (not shown). In addition, the processor 120 may perform various image processing functions such as decoding, scaling, noise filtering, frame rate conversion, and resolution conversion with respect to video data.

The processor 120 may perform audio data processing. For example, the processor 120 may perform various processing functions such as decoding, amplification, and noise filtering with respect to audio data.

The user interface 150 may be implemented as a device such as a button, a touch pad, a mouse, or a keyboard, or may also be implemented as a touch screen capable of performing together the display function and operation input function described above. Here, the button may be formed in various types such as a mechanical button formed on any area, for example, a front surface portion, a lateral surface portion, or a rear surface portion, of an outer surface of the main body of the electronic device 100, a touch pad, or a wheel.

The input/output interface 160 may be any one of a high definition multimedia interface (HDMI), a mobile high-definition link (MHL), a universal serial bus (USB), a display port (DP), a thunderbolt, a video graphics array (VGA) port, a red-green-blue (RGB) port, a D-subminiature (D-SUB), or a digital visual interface (DVI).

The input/output interface 160 may input and output at least one of an audio signal or a video signal.

According to an implementation, the input/output interface 160 may include a port inputting and outputting only an audio signal and another separate port inputting and outputting only a video signal, or may be implemented as a single port inputting and outputting both audio and video signals.

The electronic device 100' may be implemented as a device that does not include a display, and may transmit an image signal to a separate display device.

The electronic device 100' may receive a user voice signal from an external device including a microphone. In this case, the received user voice signal may be a digital voice signal, but may be an analog voice signal according to an implementation. As an example, the electronic device 100' may receive a user voice signal through a wireless communication method such as Bluetooth or Wi-Fi. Here, the external device may be implemented as a remote controller or a smart phone.

The electronic device 100' may transmit the voice signal received from the external device to an external server for voice recognition of the voice signal.

In this example, the communication module for communication with the external device and the external server may be implemented in a single unit or in separate units. For example, a Bluetooth module may be used for communication with the external device, and an Ethernet modem or a Wi-Fi module may be used for communication with the external server.

Also, according to an implementation, the electronic device 100' may further include a speaker (not shown).

The speaker (not shown) may be a component outputting not only various audio data processed by the input/output interface 160 but also various alarming sounds, voice messages, or the like.

The processor 120 may control the speaker (not shown) to output guide information according to various embodiments of the disclosure.

Meanwhile, the electronic device 100' may further include a microphone (not shown). The microphone is a component for receiving a user voice or another sound and converting the received voice or sound into audio data. For example, a user voice command for measuring a network error may be received through the microphone (not shown).

Figure 5A:
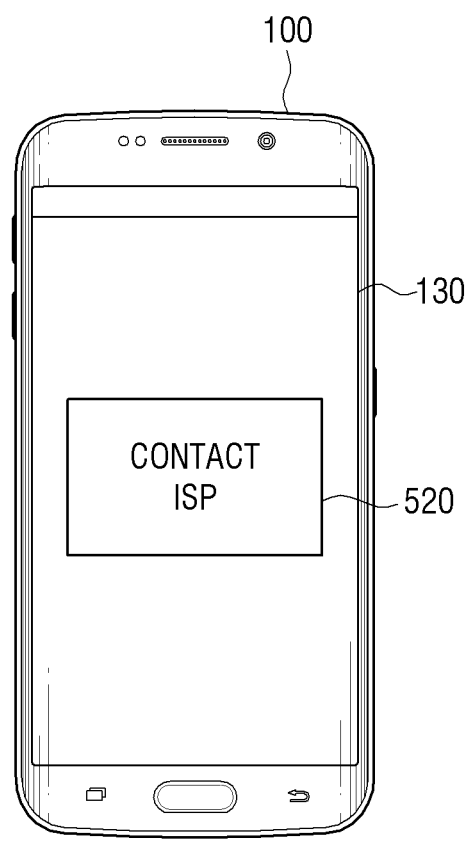
FIGS. 5A, 5B and 5C are diagrams illustrating various example user interface (UI) screens according to an embodiment of the disclosure.
Figure 5B:
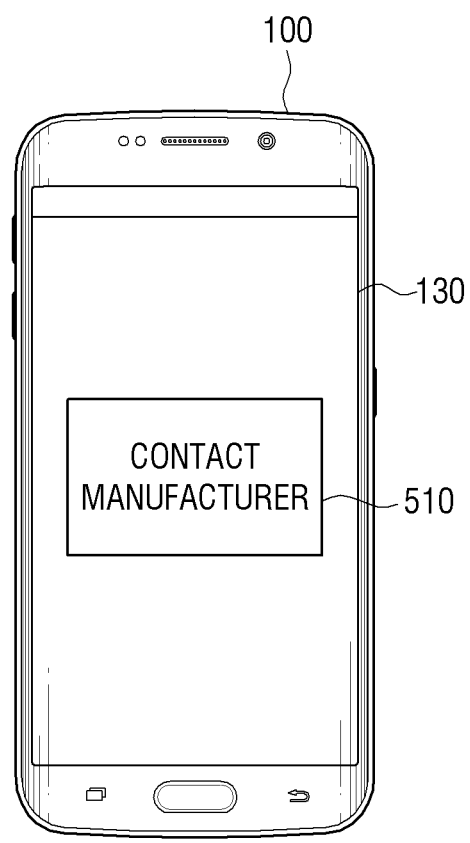
Figure 5C:
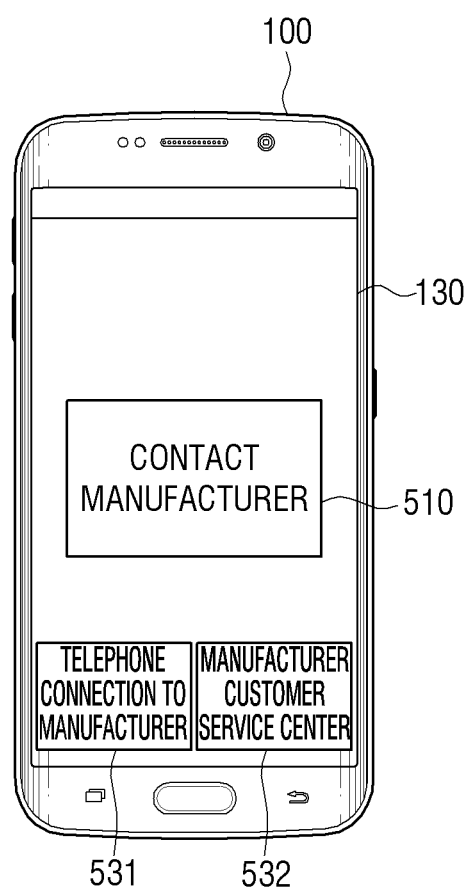

FIGS. 5A, 5B and 5C are diagrams illustrating example UIs including guide information according to an embodiment of the disclosure.

According to an embodiment of the disclosure, if the bandwidth estimated with respect to the communication network between the electronic device 100 and the AP device 20 is the threshold level or above, the processor 120 may identify that the error is not caused by the electronic device 100 or the AP device 20, and provide the first guide information corresponding to the identification result. For example, the processor 120 may provide a UI 510 including guide information such as "Contact ISP" as shown in FIG. 5A.

If the estimated bandwidth is below the threshold level, the processor 120 may identify that the error is caused by at least one of the electronic device 100 or the AP device 20, and provide the second guide information corresponding to the identification result. For example, the processor 120 may provide a UI 520 including guide information such as "Contact Manufacturer" as shown in FIG. 5B.

In addition to the UI 520 including guide information such as "Contact Manufacturer", the processor 120 may provide additional UIs for contacting the manufacturer, for example, a UI 531 for telephone connection to the manufacturer and a UI 532 for access to the manufacturer customer service center as shown in FIG. 5C. In this example, once the user selects the UI 531 or 532, the user may be connected directly to the manufacturer by telephone or may directly access the website of the manufacturer customer service center.

Figure 6A:
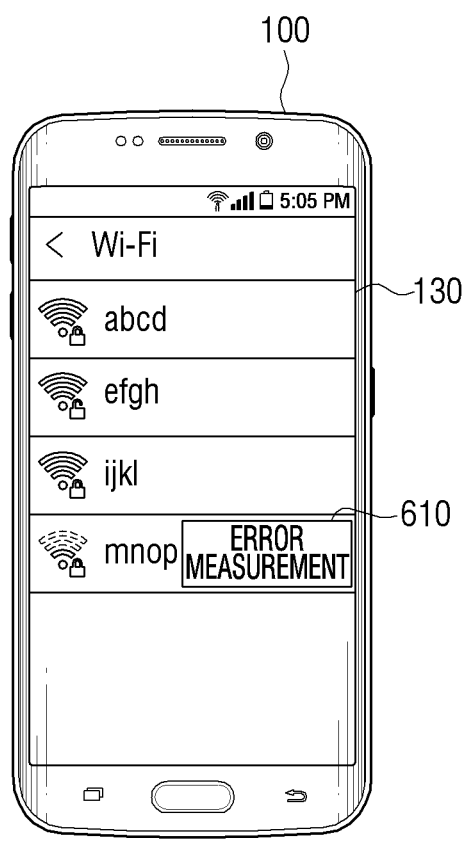
FIGS. 6A and 6B are diagrams illustrating various example UI screens according to an embodiment of the disclosure.
Figure 6B:
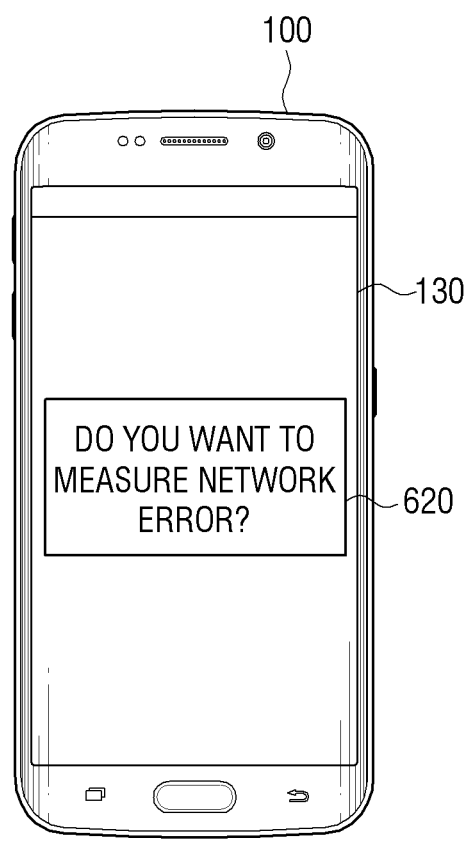

FIGS. 6A and 6B are diagrams illustrating example UIs for selecting a network bandwidth estimating function according to an embodiment of the disclosure.

According to an embodiment of the disclosure, as shown in FIG. 6A, a selection menu 610 for network error measurement may be provided on a network connection screen, for example, a Wi-Fi connection screen, particularly at one side of the portion where information of the Wi-Fi network having abnormal connection is identified. Once the user selects the menu 610, a network diagnosis operation according to an embodiment of the disclosure may be initiated. However, this is only an example embodiment, and the menu (or button) for network diagnosis may be provided on various UI screens, and in some cases, it may be provided as a hardware button. For example, when a particular hardware button is selected in a state in which a network-related application or a UI screen is provided, the network diagnosis operation according to an embodiment of the disclosure may be initiated.

Alternatively, as shown in FIG. 6B, if the processor 120 identifies that the network connection is abnormal, a UI 620 guiding network error measurement may be provided. Once the user selects the UI 620, a network diagnosis operation according to an embodiment of the disclosure may be initiated.

Figure 7A:
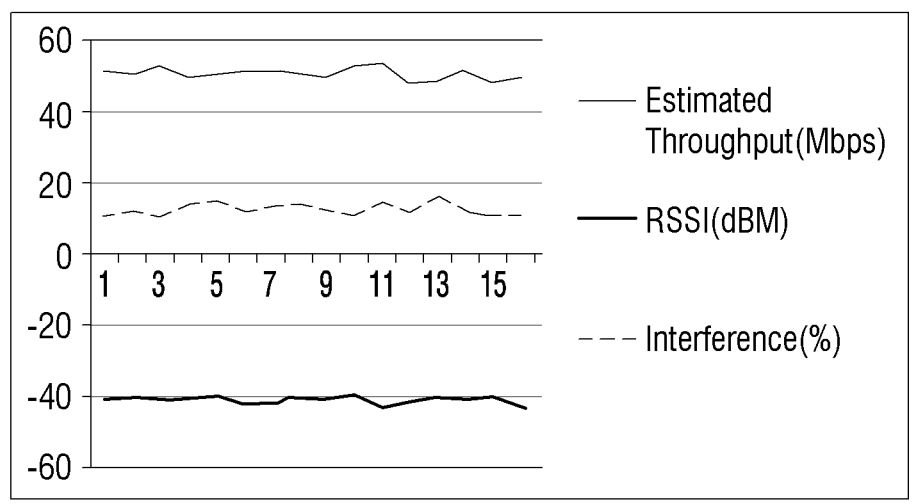
FIGS. 7A, 7B and 7C are diagrams illustrating example estimated results of Wi-Fi bandwidths according to an embodiment of the disclosure.
Figure 7B:
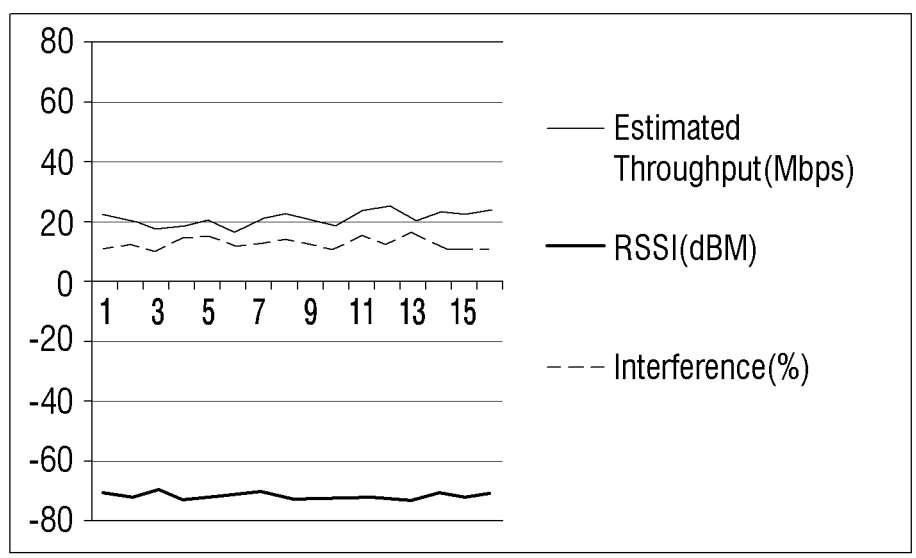
Figure 7C:
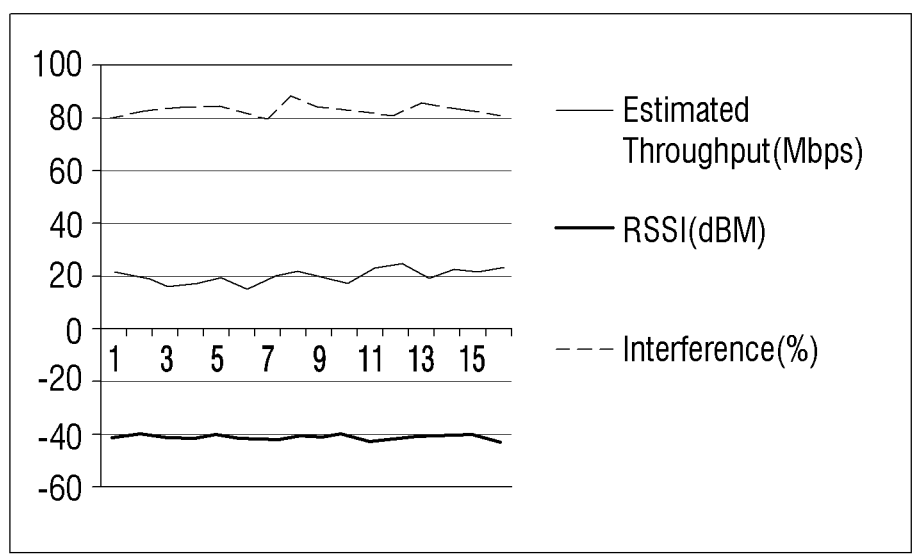

FIGS. 7A, 7B and 7C are diagrams illustrating example estimated results of Wi-Fi bandwidths according to an embodiment of the disclosure.

The disclosure may be used to identify whether the network abnormality (e.g., low throughput) of the electronic device 100 is due to a low Internet service speed provided by the ISP or due to a Wi-Fi bandwidth of the client device accessing the Internet. For example, a user may experience buffering stoppages when streaming a 4K video on a TV using a networking application. In this example, if the user selects the diagnosis menu, an operation can be triggered to estimate a Wi-Fi throughput supported by the client device.

If the estimated throughput has no problem, that is, if the Wi-Fi bandwidth is equal to or larger than the bandwidth required for 4K video streaming, the processor 120 may notify it, and the user may recognize that the ISP has a problem and the TV Wi-Fi bandwidth has no problem.

FIG. 7A is a graph showing, for example, a case in which stoppages occur during 4K video streaming while the estimated throughput is about 52 Mbps, the RSSI is strong, and the interference is low. In this example, it may be estimated that the ISP has a problem.

If the estimated throughput is abnormal, that is, if the Wi-Fi bandwidth is smaller than the bandwidth required for 4K video streaming, the processor 120 may provide a notification of this condition, and the user may recognize that there is a problem in the Wi-Fi bandwidth between the TV and the AP. FIG. 7B is a graph showing, for example, a case in which the estimated Wi-Fi bandwidth is 18 Mbps based on the low signal strength (RSSI–76 dBm), and FIG. 7C is a graph showing, for example, a case in which the estimated Wi-Fi bandwidth is 18 Mbps based on the high interference (81%). FIG. 8 is a flowchart illustrating an example method of controlling an electronic device according to an embodiment of the disclosure.

According to the example method of controlling an electronic device as shown in FIG. 8, the electronic device 100 communicates with an access point (AP) device (S810). For example, the electronic device 100 may access the AP device 20 via a Wi-Fi network.

Information associated with a communication network between the AP device 20 and the electronic device 100 is obtained (S820). For example, the electronic device 100 may obtain information associated with a communication network according to an event associated with a network error. Here, the event associated with the network error may include an event in which a user command for performing a network error check is input.

A bandwidth of the communication network is estimated based on the obtained information (S830).

It is identified whether the communication network has an error based on the estimated bandwidth (S840).

Guide information is provided based on the identification result (S850). For example, a UI screen including the guide information may be displayed.

In the providing (S850) of the guide information, first guide information may be provided if the estimated bandwidth is a threshold level or above, and second guide information may be provided if the estimated bandwidth is below the threshold level. The first guide information may include different information from the second guide information.

In the providing (S850) of the guide information, if the estimated bandwidth is the threshold level or above, it is identified that the error is not caused by the electronic device 100 or the AP device 20, and the first guide information corresponding to the identification result may be provided, and if the estimated bandwidth is below the threshold level, it is identified that the error is caused by at least one of the electronic device 100 or the AP device 20, and the second guide information corresponding to the identification result may be provided.

In the providing (S850) of the guide information, if the estimated bandwidth is the threshold level or above, it is identified that the error is caused by a communication network between the AP device 20 and an Internet service provider (ISP) 30, and the first guide information corresponding to the identification result may be provided.

The information associated with the communication network may include at least one of received signal strength indicator (RSSI) information, communication channel information, link speed information, communication protocol mode information, channel interference information, or retry rate information.

In the estimating (S830) of the bandwidth of the communication network, the bandwidth of the communication network may be estimated based on at least two factors of a mode factor obtained based on the communication protocol mode information, a link speed factor obtained based on the link speed information, a link quality ratio factor obtained based on the RSSI information and the communication protocol mode information, an interference ratio factor obtained based on the channel interference information and the communication protocol mode information, or a retry rate ratio factor obtained based on at least one of the retry rate information, the communication protocol mode information, or the RSSI information.

In the obtaining (S820) of the information associated with the communication network, the information associated with the communication network may be obtained from network firmware installed in a network adapter by driving a device driver.

According to the various example embodiments of the disclosure described above, when a network error occurs, appropriate guide information for solving the error can be provided. In addition, a network bandwidth can be measured without requiring a separate additional device.

The methods according to the various example embodiments of the disclosure described above may be implemented in the form of an application that can be installed in an existing electronic device.

Further, the methods according to the various example embodiments of the disclosure described above may be implemented by simply upgrading software or hardware of an existing electronic device.

In addition, the various example embodiments of the disclosure described above may be performed through an embedded server provided in an electronic device or through an external server of at least one of an electronic device or a display device.

According to an example embodiment of the disclosure, the various example embodiments described above may be implemented by software including instructions that are stored in a machine (e.g. a computer) readable storage medium. The machine, which is a device capable of calling an instruction stored in the storage medium and operating according to the called instruction, may include an electronic device (e.g. an electronic device A) according to the embodiments described above. In an example in which an instruction is executed by a processor, a function corresponding to the instruction may be performed directly by the processor or using other components under the control of the processor. The instruction may include a code generated by a compiler or a code executable by an interpreter. The machine-readable storage medium may be provided in the form of a non-transitory storage medium. The 'non-transitory' storage medium is tangible, and it does not limit the storage medium to mean that data is stored semi-permanently or temporarily thereon.

According to an embodiment of the disclosure, the method according to the various embodiments described above may be included and provided in a computer program product. The computer program product may be traded as a product between a seller and a buyer. The computer program product may be distributed in the form of a machine-readable storage medium (e.g. a compact disc read only memory (CD-ROM)) or online via an application store (e.g. Play Store™). In case of on-line distribution, at least a part of the computer program product may be at least temporarily stored in a storage medium such as a memory of a server of a manufacturer, a server of an application store, or a relay server, or be temporarily generated.

Further, each of the components (e.g. module or program) according to the various embodiments described above may be comprised of a single entity or a plurality of entities, and some of the sub-components described above may be omitted or another sub-component may be additionally included to various embodiments. Generally or additionally, some of the components (e.g., module or program) may be integrated into one entity, and may perform functions performed by the respective corresponding components before being integrated in the same or similar manner. Operations performed by a module, a program, or other components according to various embodiments may be executed sequentially, in parallel, repeatedly, or in a heuristic manner. In addition, at least some operations may be executed in different sequences or may be omitted. Alternatively, other operations may be added.

Although various example embodiments of the disclosure have been illustrated and described with reference to the figures, the disclosure is not limited to the specific embodiments as described above, but may be variously modified by those skilled in the art to which the disclosure pertains without departing from the true spirit and full scope of the disclosure as disclosed, for example, in the accompanying claims.

What is claimed is:

1. An electronic device, comprising:
a communicator comprising communication circuitry; and
a processor configured to:
control the communicator to communicate with an access point (AP) device connected to an internet service provider,
obtain information associated with a communication network between the AP device and the electronic device,
estimate an available bandwidth of the communication network between the AP device and the electronic device based on the obtained information,
identify whether the communication network has an error caused by at least one of the electronic device or the AP device or an error not caused by the electronic device or the AP device based on the estimated available bandwidth, and
provide guide information for solving the error caused by the at least one of the electronic device or the AP device or the error not caused by the electronic device or the AP device based on the identification result, wherein first guide information is provided based on identifying the error not caused by the electronic device or the AP device and second guide information is provided based on identifying the error caused by the at least one of the electronic device or the AP device, the first guide information including different information from the second guide information.

2. The electronic device as claimed in claim 1, wherein the processor is configured to:
estimate the bandwidth of the communication network by obtaining the information associated with the communication network based on an event associated with a network error, and
provide the first guide information based on the estimated bandwidth being a threshold level or above, and provide the second guide information based on the estimated bandwidth being below the threshold level.

3. The electronic device as claimed in claim 2, wherein, the processor is configured to, based on the estimated bandwidth being the threshold level or above, identify that the error is not caused by the electronic device or the AP device and to provide the first guide information corresponding to the identification result, and
the processor is configured to, based on the estimated bandwidth being below the threshold level, identify that the error is caused by at least one of the electronic device or the AP device and to provide the second guide information corresponding to the identification result.

4. The electronic device as claimed in claim 3, wherein, the processor is configured to, based on the estimated bandwidth being the threshold level or above, identify that the error is caused by a communication network between the AP device and an Internet service provider (ISP) and to provide the first guide information corresponding to the identification result.

5. The electronic device as claimed in claim 2, wherein the event associated with the network error includes an event of receiving an input command entered by a user for performing a network error check.

6. The electronic device as claimed in claim 1, wherein the information associated with the communication network includes at least one of received signal strength indicator (RSSI) information, communication channel information, link speed information, communication protocol mode information, channel interference information, or retry rate information.

7. The electronic device as claimed in claim 6, wherein the processor is configured to estimate the bandwidth of the communication network based on at least two factors of a mode factor obtained based on the communication protocol mode information, a link speed factor obtained based on the link speed information, a link quality ratio factor obtained based on the RSSI information and the communication protocol mode information, an interference ratio factor obtained based on the channel interference information and the communication protocol mode information, or a retry rate ratio factor obtained based on at least one of the retry rate information, the communication protocol mode information, or the RSSI information.

8. The electronic device as claimed in claim 1, wherein the processor is configured to obtain the information associated with the communication network from network firmware installed in a network adapter by driving a device driver.

9. The electronic device as claimed in claim 1, further comprising a display,
wherein the processor is configured to control the display to display the guide information.

10. The electronic device as claimed in claim 1, wherein the communication network includes a Wi-Fi network.

11. A method of controlling an electronic device, comprising:
communicating with an access point (AP) device connected to an internet service provider;
obtaining information associated with a communication network between the AP device and the electronic device;
estimating an available bandwidth of the communication network between the AP device and the electronic device based on the obtained information;
identifying whether the communication network has an error caused by at least one of the electronic device or the AP device or an error not caused by the electronic device or the AP device based on the estimated available bandwidth; and
providing guide information for solving the error caused by the at least one of the electronic device or the AP device or the error not caused by the electronic device or the AP device based on the identification result, wherein first guide information is provided based on identifying the error not caused by the electronic device or the AP device and second guide information is provided based on identifying the error caused by the at least one of the electronic device or the AP device, the first guide information including different information from the second guide information.

12. The method as claimed in claim 11, wherein, in the estimating of the bandwidth of the communication network, the bandwidth of the communication network is estimated by obtaining the information associated with the communication network according to an event associated with a network error, and
in the providing of the guide information, the first guide information is provided based on the estimated bandwidth being a threshold level or above, and the second guide information is provided based on the estimated bandwidth being below the threshold level.

13. The method as claimed in claim 12, wherein in the providing of the guide information:
based on the estimated bandwidth being the threshold level or above, it is identified that the error is not caused by the electronic device or the AP device and the first guide information corresponding to the identification result is provided, and
based on the estimated bandwidth being below the threshold level, it is identified that the error is caused by at least one of the electronic device or the AP device and the second guide information corresponding to the identification result is provided.

14. The method as claimed in claim 13, wherein, in the providing of the guide information, based on the estimated bandwidth being the threshold level or above, it is identified that the error is caused by a communication network between the AP device and an Internet service provider (ISP) and the first guide information corresponding to the identification result is provided.

15. The method as claimed in claim 12, wherein the event associated with the network error includes an event of receiving an input command entered by a user for performing a network error check.

16. The method as claimed in claim 11, wherein the information associated with the communication network includes at least one of received signal strength indicator (RSSI) information, communication channel information, link speed information, communication protocol mode information, channel interference information, or retry rate information.

17. The method as claimed in claim 16, wherein, in the estimating of the bandwidth of the communication network, the bandwidth of the communication network is estimated based on at least two factors of a mode factor obtained based on the communication protocol mode information, a link speed factor obtained based on the link speed information, a link quality ratio factor obtained based on the RSSI information and the communication protocol mode information, an interference ratio factor obtained based on the channel interference information and the communication protocol mode information, or a retry rate ratio factor obtained based on at least one of the retry rate information, the communication protocol mode information, or the RSSI information.

18. The method as claimed in claim 11, wherein, in the obtaining of the information associated with the communication network, the information associated with the communication network is obtained from network firmware installed in a network adapter by driving a device driver.

19. The method as claimed in claim 11, wherein the providing of the guide information further includes displaying the guide information on a display.

20. A non-transitory computer readable recording medium having stored thereon computer instructions which, when executed by a processor of an electronic device, causes the electronic device to perform operations, wherein the operations include:
obtaining information associated with a communication network between an access point (AP) device and the electronic device connected to an internet service provider;
estimating an available bandwidth of the communication network between the AP device and the electronic device based on the obtained information;
identifying whether the communication network has an error caused by at least one of the electronic device or the AP device or an error not caused by the electronic device or the AP device based on the estimated available bandwidth; and
providing guide information for solving the error caused by the at least one of the electronic device or the AP device or the error not caused by the electronic device or the AP device based on the identification result, wherein first guide information is provided based on identifying the error not caused by the electronic device or the AP device and second guide information is provided based on identifying the error caused by the at least one of the electronic device or the AP device, the first guide information including different information from the second guide information.

* * * * *